(12) United States Patent
Hatayama

(10) Patent No.: US 6,313,929 B1
(45) Date of Patent: Nov. 6, 2001

(54) IMAGE PROCESSING APPARATUS

(75) Inventor: Fumihiro Hatayama, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 08/358,166

(22) Filed: Dec. 16, 1994

(30) Foreign Application Priority Data

Dec. 22, 1993 (JP) .................................................. 5-346219

(51) Int. Cl.[7] ........................................................ H04N 1/04
(52) U.S. Cl. ............................ 358/490; 358/487; 358/444
(58) Field of Search .................................... 358/487, 493, 358/490, 489, 444, 506; 348/96, 97

(56) References Cited

FOREIGN PATENT DOCUMENTS

| 3324736 | 1/1984 | (DE) . |
|---|---|---|
| 0 310 891 | 4/1989 | (EP) . |
| 2 538 649 | 12/1983 | (FR) . |
| 63-288564 | 11/1988 | (JP) . |

Primary Examiner—Cheukfan Lee
(74) Attorney, Agent, or Firm—McDermott, Will & Emery

(57) ABSTRACT

A processing time is reduced without using expensive hardware. A head reads images of originals which are contained in an i-th original photo film Fi all at one time as it moves in a subscanning direction and as an original drum rotates in a main scanning direction. At this stage, a switch connects the head to a first band memory and a switch connects a second band memory to an image processing circuit. During the reading of the images, image signals are stored in memory sectors of the first band memory original by original while image signals regarding an (i−1)-th original photo film (F(i−1)) are serially read, processed and stored in a magnetic disk original by original. When the head read images of an original photo film (F(i+1)) all at one time, the switches are switched each other so that writing in the second band memory and reading from the first band memory are performed simultaneously.

8 Claims, 8 Drawing Sheets

IMAGE PROCESSING APPARATUS

BACKGROUND OF THE INVENTION

1. Field of the Invention

The present invention relates to an image processing apparatus which processes an array of n original mount areas ($n \geq 2$) of a subscanning direction each including a plurality of originals which are arranged in a line in a main scanning direction.

2. Description of the Background Art

There is a need for scanning an array of a number of originals and for storing resultant image signals (which express image data) in a storage medium such as a disk for original by original. One of conventional methods to meet this need is as follows.

Each original is scanned over its image area, all image processing steps necessary for each original are performed, and resulting image signals are stored as files. FIG. 7 shows an example of this. In FIG. 7, a first original is scanned and its image is read during a period from a time $t_{s0}$ to a time $t_{s1}$. Resultant image signals are stored in a memory and thereafter processed under an image processing condition which is set for this original. The processed image signals of the first original are stored in a disk as a file 1 during a period from the time $t_{s1}$ to a time $t_{F1}$. At the time tsl, an image reading head is moved to a second original. The second original is scanned and its image is read during a period from the time $t_{s1}$ to a time $t_{s2}$. In a similar manner, during a period from the time $t_{s2}$ to a time $t_{f2}$, processed image signals of the second original are stored in a disk as a file 2, while concurrently moving the head to a third original to start reading and processing of the third original. Such processes are performed in series until processing of the last original is complete. Scanning in the main scanning direction may be performed by a line scanning element such as a CCD installed in the head or a surface scanning element installed in the head. Scanning in the subscanning direction may be realized by moving the head in the subscanning direction. Scanning takes about 100 seconds, for example, whereas filing takes drastically shorter 24 seconds.

The conventional method above is not satisfactory since it is necessary to move the head for each original and a scanning time necessary for every original cannot be eliminated. It takes a long time to complete filing of image signals of all originals, which directly counters a recent need for high-speed mass processing.

One approach to deal with this is to define a scanning area in advance and to perform image processing while switching image processing conditions for the respective originals on a real time basis during scanning. See FIGS. 8A and 8B for details. In FIG. 8A, two originals A and B are placed next to each other. Assume that the originals A and B are being read by a head 60 along a main scanning line SL. Here, a switch 61 of FIG. 8B is switched under control every time the head 60 sweeps over intersections of the main scanning line SL and the originals A and B. In other words, at an intersection P1, the switch 61 is connected to an image processing circuit 62 (in which an image processing condition for the original A is set). While the head 60 moves from the intersection P1 to an intersection P2, the image processing circuit 62 processes image signals which are read by the head 60 and processed image signals are stored in a disk 65. At an intersection P3, the switch 61 is switched to an image processing circuit 63 (in which an image processing condition for the original B is set) so that the image processing circuit 63 processes image signals which are obtained between the intersection P3 and an intersection P4. The switch 61 is switched under the control of a CPU 64 which operates in accordance with signals outputted by the head 60 such as a position detect signal.

It is true that the approach above makes it unnecessary to move the head for each original, thereby reducing the total processing time. However, demanding a high main-processing speed and a switching circuit which can operate at an accordingly high speed and requiring a plurality of image processing circuits as described above, this approach to be realized without expensive hardware. To a further disadvantage, high-speed processing may not be possible at all because of slower storing of signals in the disk during filing. Thus, this approach is not practical and is not acceptable in any regard. It is therefore important to offer an improved technique which solves all of these problems at the same time.

SUMMARY OF THE INVENTION

The present invention is related to a method of applying different image processing steps to respective image signals obtained by reading a set of originals, the method comprising the steps of: a) holding said set of originals a in two dimensional array consisting of a parallel arrangement of a plurality of original trains, each of said original trains consisting of a plurality of originals; b) reading respective images of said set of originals for each original train to generate a series of image signals; c) alternately selecting one of first and second storage means to alternately write said series of image signals for each original train into said one of said first and second storage means selected d) alternately reading said series of image signals for each original train out of the other of said first and second storage means which is not currently selected the step c) to thereby obtain original image signals; and e) applying different image process steps to said original image signals for each original, respectively.

Preferably, the step b) comprises the step of: b-1) reading said set of originals for each scanning line passing through said plurality of originals, the step a) comprises the step of: a-1) holding said set of originals such that each original train is held in a main scanning direction and said parallel arrangement is an arrangement of said plurality of said original trains held in a subscanning direction, and the step c) comprises the step of: c-1) accumulating said series of image signals for respective scanning lines for each original train in said one of said first and second storage means to thereby establish original image signals representing said plurality of originals in said one of said first and second storage means.

Further, the step b-1) may comprise the step of reading said set of originals for each original train in response to timing signals, to thereby obtain said series of image signals which are synchronized with said timing signals, and the step c) may comprise the step of: c-2) delivering said series of said image signals to said one of said first and second storage means in response to said timing signals. The step d) may comprise the step of: d-1) alternately reading said series of image signals for each original train out of the other of said first and second storage means in response to said timing signals.

The step a) may comprise the step of: a-2) storing respective coordinate values which represent positions of respective originals held by said step a-1), and said step d-1) may comprise the step of alternately reading said series of image signals out of the other of said first and second storage means in accordance with said respective coordinate values.

The method may further comprise the step of: f) setting respective conditions applying different image process steps to said original image signals for each original, respectively.

Preferably, the step b) comprises the step of: b-1) reading said set of originals for each scanning line passing through said plurality of originals, the step a) comprises the step of: a-1) holding said set of originals such that each original train is held in a main scanning direction and said parallel arrangement of said plurality of said original trains which are held in a subscanning direction, and the step c) comprises the step of: c-1) accumulating said series of image signals for respective scanning in said one of said first and second storage means to establish original image signals representing said plurality of originals in said one of said first and second storage means.

Further, the step b-1) may comprise the step of reading said set of originals for each original train in response to timing signals, to thereby obtain said series of image signals synchronized with said timing signals, and the step c) may comprise the step of: c-2) delivering said series of said image signals to said one of said first and second storage means in response to said timing signals. The step d) may comprise the step of: d-1) alternately reading said series of image signals for each original train out of the other of said first and second storage means in response to said timing signals.

The step a) may comprise the step of: a-2) storing respective coordinate values which represent positions of respective originals held by said step a-1), and said step d-1) may comprise the step of alternately reading said series image signals out of the other of said first and second storage means in accordance with said respective coordinate values.

The method may further comprise the step of: f) setting respective conditions of said different image process steps prior to the step b).

The present invention is also related to an image processor for applying different image process steps to respective image signals obtained by reading a set of originals, which comprises: original holder means for holding said set of originals in a two dimensional array consisting of a parallel arrangement of a plurality of original trains, each original train consisting of a plurality of originals; image reader means for reading respective images of said set of original for each original train to generate a series of image signals; first and second storage means each of which is capable of storing said series of said image signals for each original train; write-control means for alternately selecting one of said first and second storage means to alternately write said series of image signals for each original train into said one of said first and second storage means selected; read-control means for alternately reading said series of image signals for each original train out of the other of said first and second storage means which is not currently selected by said write-control means to thereby obtain image signals for each original train; and image processing means for applying different image process steps to said original image signals for each original, respectively.

Preferably, said image reader means comprises an image-scan reader operable to read said set of originals for each scanning line passing through said plurality of originals, each original train is held on said original holding means in a main scanning direction, said parallel arrangement is an arrangement of said plurality of original trains in a subscanning direction, and said series of image signals for respective scanning lines are accumulated for each original train in said first and second storage means to establish original image signals representing said plurality of originals in said one of said first and second storage means.

The image processor may further comprises timing signal generator means for generating timing signals, and said image reader means may comprise means for reading said set of originals for each original train in response to said timing signals to thereby obtain said series of image signals synchronized with said timing signals. The write-control means may comprise: first switching means for connecting said image reader means to said one of said first and second storage means in response to said timing signals; and second switching means for connecting the other of said one of said first and second storage means to said image processing means in response said timing signals.

The image processor may further comprise means for storing respective coordinate values which represent positions of respective originals on said original holding means. The read-control means may comprise means for reading said original image signals out of the other of said first and second storage means in accordance with said respective coordinate values.

The image processor may further comprise means for setting respective conditions of said different image process steps.

As described above, where the image reader means are reading images of all originals of an odd-numbered area all at one time, the switching means couples an output of the image reader means to the input of the first storage means and couples an output of the second storage means to the input of the image processing means. Hence, image signals outputted by the image reader means are stored in the first storage means. On the other hand, the second storage means stores image signals of an even-numbered original mount area. The image signals stored in the second storage means therefore are serially read original by original, and supplied to the image processing means. As a result, while the image reader means reads the images of the originals of the odd-numbered original mount area at one time, the image processing means processes the image signals of the originals which are contained in the previous even-numbered original mount area under corresponding image processing conditions and the output means outputs processed image signals obtained for the originals original by original.

Next, when the image reader means starts image reading for the next even-numbered original area, in response to this, the switching means connects an output of the image reader to the input of the second storage means and connects an output of the first storage means to the input of the image processing means. Thus, while the images of the originals of this even-numbered original area are read all at one time and resulting image signals are stored in the second storage means, the image signals of the originals which are contained in the previous odd-numbered original area are serially read original by original from the first storage means and processed.

Of course, image signals are not present in the second storage means and any image processing is not performed yet while image reading is performed on the first original mount area. In addition, since there is no next original mount area left after image signals of originals of an n-th original mount area are stored in the first or the second storage means, subsequent processes to be performed are only processing of these image signals original by original and outputting to the output means.

Thus, since the two process steps (reading of originals + subsequent storing of data) and (image processing + subsequent outputting) are performed original mount area by original mount area, an image reading time is reduced and image reading and image processing are performed concurrently. It is to be noted that concurrent execution of image reading and image processing is attained without using expensive hardware unlike in the conventional technique. This makes it possible to obtain an image processing apparatus which realizes lower costs and high-speed mass processing.

Accordingly, it is an object of the present invention to obtain image processing apparatus which realizes lower costs and high-speed mass processing.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
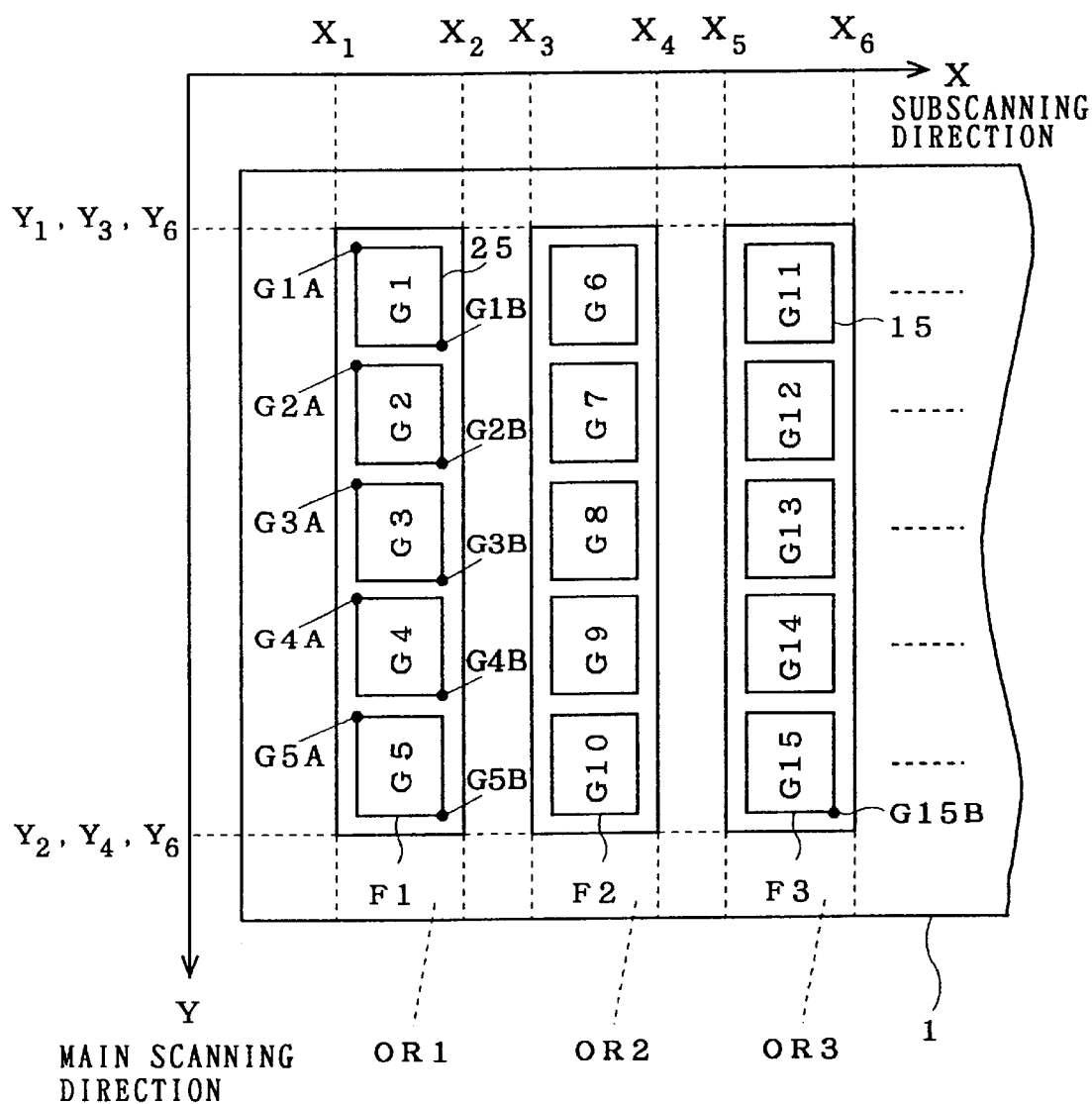
FIG. 1 is an explanatory diagram which shows originals which are arranged within original mount areas and image areas of the originals.

FIG. 1 is a view showing an arrangement of original photo films F1, F2, F3 . . . which are mounted on an original drum 1. The original photo films F1, F2, F3 . . . are respectively arranged within original mount areas OR1, OR2, OR3 . . . which extend parallel to each other in a main scanning direction Y. In FIG. 1, each original photo film (F1, F2, F3 . . . ) contains five originals (F1: Originals G1 to G5, F2: Originals G6 to G10, F3: Originals G11 to G15). Although not shown in FIG. 1, there are n original photo films (F1 to Fn) in total (n≧2). An image area of one original is as indicated at numerical reference 15 in FIG. 1.

In this embodiment, images of the originals which are arranged in such an arrangement are read and processed, and image signals are stored original by original in a secondary storage medium such as magnetic disk to realize lower costs and high-speed mass processing. To realize lower costs and high-speed mass processing, the present embodiment adopts the following unique method. An outline of this method is as described immediately below.

(a) A plurality of originals which are arranged in the main scanning direction Y within one original mount area (i.e., all originals included in this particular original mount area) are scanned at one time.

(b) Image signals obtained by scanning are stored in one of two band memories for each original mount area. These two band memories are switched each other in accordance with an original mount area which is currently being scanned.

(c) During scanning of (a), image signals of all originals of a previous original mount area are read original by original from one of the band memories. The image signals read from this band memory are processed and stored as a file in a secondary storage medium, whereby files for the respective originals are created.

(d) A plurality of originals arranged parallel to each other in the main scanning direction Y (all originals contained in the next original area) are scanned at one time in the manner described at (a) above to read images of the respective originals. The steps (b) and (c) are performed during this scanning as well. However, it is to be noted that the roles of the memories used at the steps (b) and (c) are switched to each other.

Figure 2:
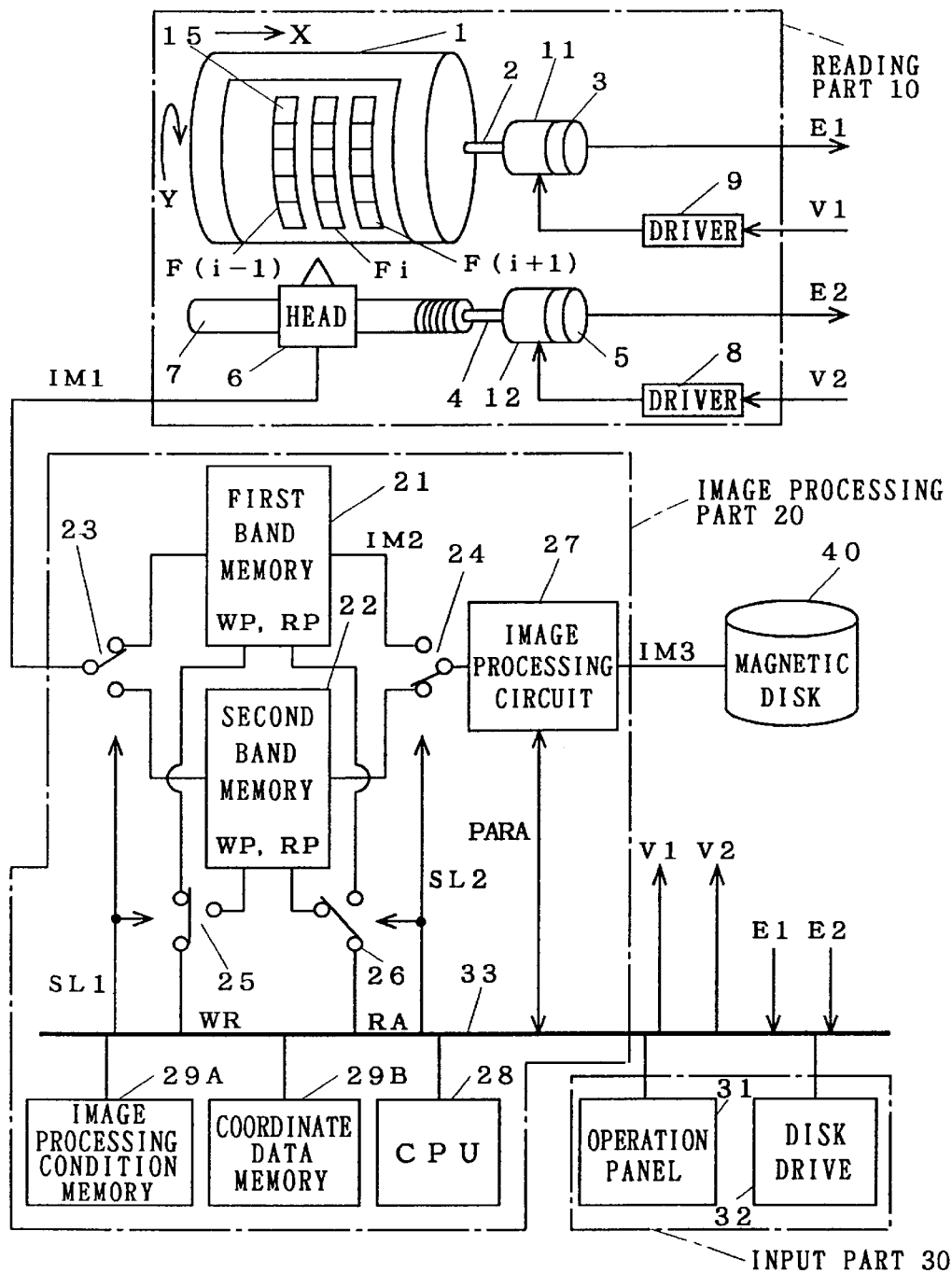
FIG. 2 is a block diagram which shows a structure of an image processing apparatus according to a preferred embodiment of the present invention.

FIG. 2 is a block diagram showing a preferred embodiment of an image processing apparatus which is applied to the method above. The image processing apparatus is generally divided in a reading part 10, an image processing part 20, an input part 30 and a magnetic disk 40.

The reading part 10 reads images of originals which are arranged as shown in FIG. 1 original mount area by original mount area all at one time, and outputs image signals IM1. Core components of the reading part 10 are an original drum 1 and a head 6. On the surface of the original drum 1, n original photo films F1 to Fn are pasted or vacuum-sucked in the arrangement of FIG. 1. In FIG. 2, however, for simplicity of illustration, the original drum 1 is shown as mounting only an (i−1)-th original photo film F(i−1), an i-th original photo film Fi and an (i+1)-th original photo film F(i+1) (2≦i≦n−1, in this sense). Any original photo film will be hereinafter referred to generally as an original photo film Fi (1≦i≦n, in this sense). Driven by a motor 11 which is actuated, by a driver 9 in response to a drive signal V1 which is outputted by a CPU 28, the original drum 1 rotates in the main scanning direction Y. The position at which the motor 11 rotates is detected by a rotary encoder 3 which is secured to one end of a center shaft 2 of the original drum 1. A detection signal E1 indicative of the position of rotation of the motor 11 is supplied to the CPU 28 through a system bus 33. Thus, by the detection signal E1, the CPU 28 knows a current reading position in the main scanning direction Y.

The head 6 includes a photo detector (not shown) which is formed by a photo diode, a photo multiplier or other suitable element. The photo detector detects light which is transmitted by the image area 15 of each original, and outputs an image signal IM1 which expresses the transmitted light to the image processing part 20. The head 6 is threadingly engages a ball screw 7. With a motor 12 secured to one end of the ball screw 7, the head 6 slides in a subscanning direction X by the motor 12. (The motor 12 is controlled by a driver 8 which is activated by a drive signal V2 received from the CPU 28.) Movement of the head 6 in the subscanning direction X is detected by a rotary encoder 5 which is fixedly attached to the drive axis of the motor 12, and a detection signal E2 which is indicative of the movement of the head 6 is supplied to the CPU 28. Thus, the head 6 operates under the control of the CPU 28 so as to read images scanning line by scanning line by moving in the subscanning direction X in synchronism with rotation of the original drum 1 of the main scanning direction Y. In this manner, images of originals of each original mount area ORi (i.e., an original mount area to which each original photo film Fi belongs) are read at one time.

Besides the CPU 28, a key component, the image processing part 20 includes a first and a second band memories 21 and 22, switches 23 to 26, an image processing circuit 27, an image processing condition memory 29A and a coordinate data memory 29B. The first and the second band memories 21 and 22 each include a plurality of memory sectors. Each storage region has a memory capacity which is sufficient to store image signals of one original photo film which belongs to one original mount area. Designation of memory sectors and designation of storage location within each storage region are executed under the control of a write address signal WR which is outputted by the CPU 28. On the other hand, a read address signal RA also supplied by the CPU 28 controls reading of an image signal which is stored at storage location within a storage region.

The switches 23 and 25 are both switched in response to a switch control signal SL1 supplied from the CPU 28 while the switches 24 and 26 are both switched in response to a switch control signal SL2 (which is in synchronism with the switch control signal SL1) supplied from the CPU 28. The image processing condition memory 29A stores data regarding image processing conditions which are set in advance for the respective originals. As herein termed, "image processing conditions" are conditions (or parameters) which are necessary for performing color computations such as RGB/YMCK conversion, gradation conversion and contour enhancement and other processes such as angular conversion and magnification conversion of an original. Such image processing is performed by the image processing circuit 27. The coordinate data memory 29B stores coordinate data regarding each original mount area ORi and each original Gj ($1 \leq j \leq 5 \cdot n$).

Various instructions from an operator to the CPU 28 are received by the input part 30. The input part 30 is comprised of an operation panel 31 and a disk drive 32. The components 31 and 32 are both connected to the CPU 28 through the system bus 33.

The magnetic disk 40 is a secondary storage medium for filing image signals IM3 original by original. After completing filing for all originals, image data stored in the magnetic disk 40 are utilized in an image outputting device (e.g., an output scanner, a printer, a display device), an image editing device (e.g., a total scanner) and etc.

Figure 3:
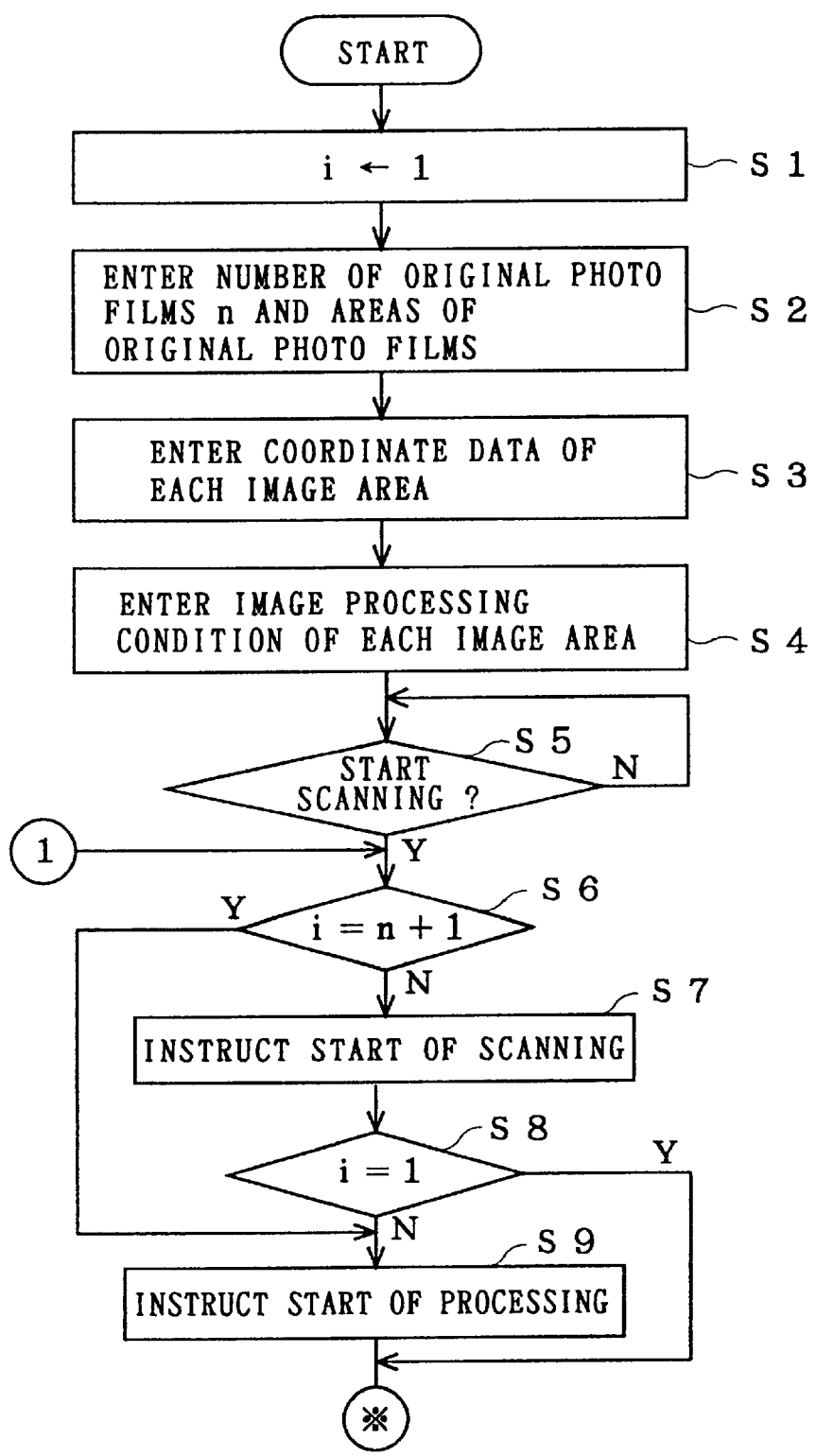
FIGS. 3 and 4 as they are combined are a flow chart which shows a processing sequence performed in the image processing apparatus.
Figure 4:
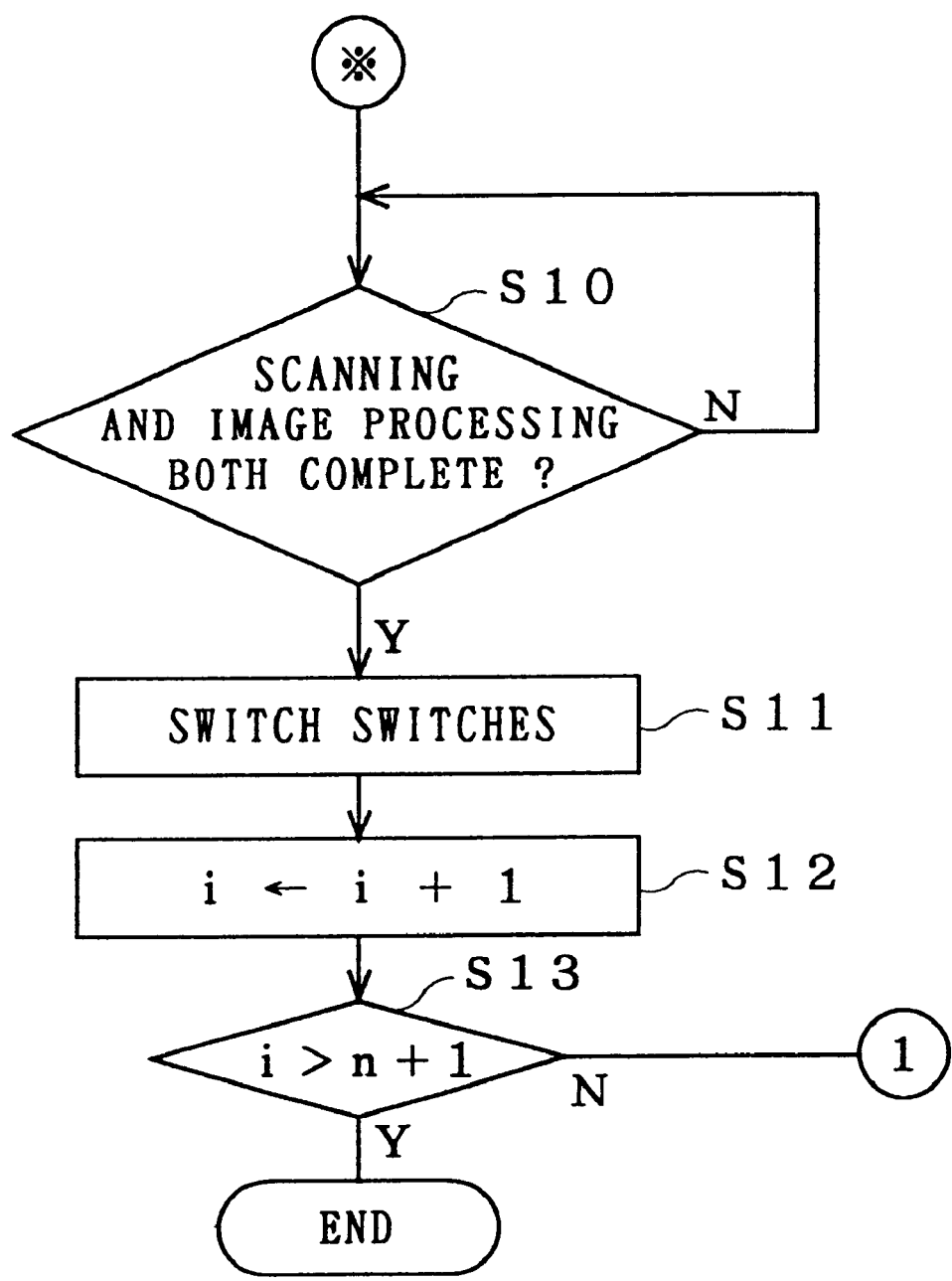

FIGS. 3 and 4 in combination show a flow chart of a processing sequence performed in such an image processing apparatus as above. In the following, the unique technique mentioned above will be described in more details with reference to the flow chart.

(Step S1) A variable i which expresses the number of original photo films Fi to be read is initialized to "1." This initialization is performed in response to an initialization instruction which is supplied to the CPU 28 through the operation panel 31 by an operator.

(Step S2) Upon entry of the number n the original photo films Fi through the operation panel 31, coordinate data which designates a mounting area of each original photo film Fi (i.e., the original mount area ORi) is inputted via the operation panel 31; that is to input coordinate values $X_1$, $X_2$, $X_3$ ... $X_{2n-1}$, $X_{2n}$ regarding the subscanning direction X and coordinate values Y, $Y_2$, $Y_3$, $Y_2$ -1, $Y_2$ regarding the main scanning direction Y as shown in FIG. 1. These coordinate values are stored in the coordinate data memory 29B as coordinate data. In this embodiment (FIG. 1), the values $Y_1, Y_3, Y_5 \ldots Y_{2n-1}$ are the same. Hence, the values $Y_1$ and $Y_2$ alone may be entered instead of inputting all of these coordinate values.

(Step S3) Coordinate data regarding the image area 15 of each original is inputted through the operation panel 31. Since the image area 15 is a rectangular area in this embodiment, it is possible to designate the image area 15 by entering coordinate values of the upper-left apex and the lower-right apex of the image area 15. Coordinate values of these two apexes must be entered for each image area 15 together with the identification code IDi of each Image area 15. For the original G1, for instance, coordinate values of apexes G1A and G1B and the identification code ID1 are entered. These coordinate values GjA and GjB and the identification code IDi are stored in the coordinate data memory 29B also as coordinate data. Since the original photo films Fi are equally of a predetermined size and are arranged at predetermined intervals in most cases and hence may be respectively set at predetermined positions, inputting at the steps S2 and S3 can be omitted if coordinate data expressing the predetermined positions of the original photo films Fi are stored in the coordinate data memory 29B in advance.

(Step S4) Image processing conditions for the respective originals Gj (or the respective image areas 15) are entered through the operation panel 31 together with the identification codes IDi of the respective image areas 15. The entered conditions are stored in the image processing condition memory 29A. Here, instead of storing the image processing conditions in the image processing condition memory 29A, the image processing conditions may be stored in a flexible disk or the like using an independent external apparatus (such as a personal computer) and the flexible disk may be inserted in the disk drive 32.

(Step S5) The CPU 28 judges whether the operator has pushed a scam start switch (not shown) of the operation panel 31. If YES, the sequence proceeds to a step S6.

(Step S6) The CPU 28 judges whether the variable i is equal to "n+1," i.e., whether reading of images has completed for all the original photo films F1 to Fn. If i=n+1, the sequence proceeds to a step S7 since further reading of images is not necessary.

(Step S7) If i≠n+I at the step S6 (that is, if i<n+1), the CPU 28 orders the reading part 10 to start reading images which are included in a target original mount area ORi (e.g., OR1) to be read. Now, if the i-th original photo film Fi is a target to be read, the CPU 28 reads coordinate data regarding the original photo film Fi (i.e., $X_{2i-1}$, $X_{2i}$, $Y_1$ $Y_2$) from the coordinate data memory 29B, and controls rotation of the original drum 1 and movement of the head 6 in accordance with this coordinate data. The head 6 therefore moves toward the original mount area ORi and starts reading images of originals G (5·i–4) to G (5·i) which belong to the original photo film Fi. In a case where the switches 23 and 25 are connected to an input terminal and a write terminal WP of the first band memory 21, respectively, while the switches 24 and 26 are respectively connected to an output terminal and a read terminal RP of the second band memory 22, each image signal IM1 regarding each main scanning line which is outputted by the head 6 stored in the first band memory 21. Hence, designation of addresses is executed in response to the write address WR mentioned earlier. The write address signal WR is generated and outputted by the CPU 28 based on the detection signals E1 and E2 which are outputted by the rotary encoders 3 and 5.

(Step S8) The CPU 28 judges whether the variable i is equal to "1," 1.e., whether the first original mount area OR1 is currently being read. This is because there is no need to perform the next step S9 if i="1."

(Step S9) The CPU 28 instructs one of the band memories (21 or 22) which has not been engaged in writing of data since the step S7 and the image processing circuit 27 to start the series of processes, namely, serial reading of the already stored image signals IM1 for each original Gj in accordance with the coordinate data regarding the image area 15 of each original Gj which was already entered at the step S3, processing of the image signals and filing of the image signals. In short, the process at the step S9 is executed concurrently with reading of the image signals which started at the step S7.

The step S9 is as follows if the conditions has not been changed from those set at the step S7. The switches 24 and 26 are both connected to the second band memory 22, and the image signals expressing originals G (5·i-9) to G (5(i-1)) which belong to the previous (i-1)-th original photo film F(i-1) are stored in the second band memory 22. When the CPU 28 supplies the read address signal RA to the second band memory 22 in accordance with the coordinate data regarding the image area 15 of each original Gj which was entered at the step S3, the second band memory 22, in response to the read address signal RA, outputs the image signals IM1 which are stored for each original as image signals IM2. Receiving the image signals IM2 and in accordance with an image processing condition setting signal PARA which is outputted by the CPU 28 to have a variable level which changes for the respective originals, the image processing circuit 27 performs image processing. Upon completion of image processing, the image processing circuit 27 serially outputs processed image signals to the magnetic disk 40 as image signals IM3. The magnetic disk 40 stores the image signals IM3 original by original. This completes filing for each original.

(Step S10) The CPU 28 judges whether concurrently performed reading of images of an original photo film and image processing have both completed. That is, after outputting the last image signal IM3, the image processing circuit 27 outputs an instruction which indicates that outputting of the last image signal IM3 is complete to the CPU 28. Receiving the instruction, the CPU 28 detects the completion of outputting of the last image signal IM3.

It is to be noted that reading from the other band memory and associated image processing are not performed during reading of the images of the first original photo film F1. In addition, after completion of reading of the images of the n-th original photo film Fn, it is only reading, processing and filing of the image signals IM1 that must be performed. Hence, with respect to reading of the images of the first original photo film F1, whether image reading has completed is judged at the step S10. After completion of reading of the images of the n-th original photo film Fn, whether image processing has completed is judged at step S10.

The CPU 28 disables the reading part 10 if image processing still continues even though reading of images has completed.

(Step S11) Confirming completion of both image reading and image processing, the CPU 28 switches the switches 23 to 26. More exactly, the levels of the switch control signals SL1 and SL2 are changed, and the switches 23 to 26 are switched to the other band memory side (21 or 22) in accordance with the changes in the level of these signals.

Now, under the conditions the same as those set at the steps S7 and S9, the switches 23 and 25 both switch to the second band memory 22 side while the switches 24 and 26 both switch to the first band memory 21 side. This connects the output terminal of the head 6 to the input terminal of the second band memory 22 and renders the write address signal WR to be outputted to the write terminal WP of the second band memory 22. The output terminal of the first band memory 21 is connected to the input terminal of the image processing circuit 27 so that the read address signal RA is outputted to the read terminal RP of the first band memory 21.

(Step S12) The CPU 28 adds "1" to the variable i to update the variable to the resulting value.

(Step S13) The CPU 28 judges whether the updated variable i satisfies i>(n+1), i.e., whether all process steps are complete. If all process steps are not complete yet, processing of the next original photo film (which must be the (i+1)-th original photo film F(i+1) according to the conditions of the step S7) is continued (i.e., to return to the step S6) If i=(n+1), however, it is only reading, processing and subsequent treatments of the image signals IM1 of the respective originals of the n-th original photo film Fn that must be performed. As a result, a series of processes from the steps S6 to S13 is repeatedly performed until i>(n+1) is satisfied.

Figure 5:
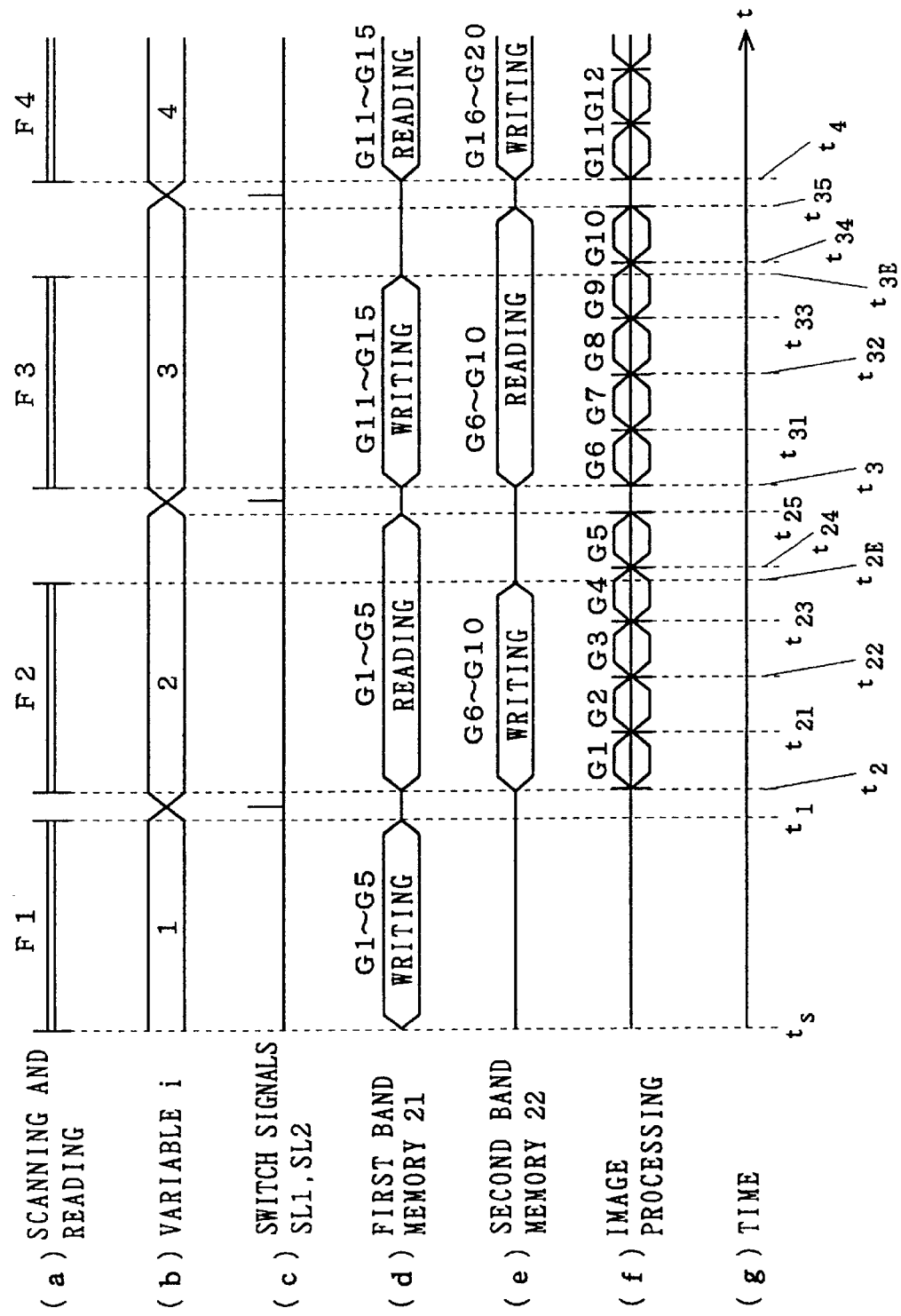
FIG. 5 is a timing chart which shows processes performed in the image processing apparatus in a time-series manner.

FIG. 5 is a timing chart showing flows of the processes at the respective parts in a time-series manner. First, during a period from time $t_s$ to a time $t_1$, the images of the originals G1 to G5 of the first original photo film F1 are read all at one time (Section (a) of FIG. 5). Concurrently with this, the first band memory 21 writes image signals for each one of the originals G1 to G5 (Section (d) of FIG. 5). The variable i changes to 2 during a period from the time $t_1$, to a time $t_2$ (Section (b) of FIG. 5), causing the switch control signals SL1 and SL2 to accordingly rise from "0" level to "1" level (Section (c) of FIG. 5) so that the switches 23 and 25 are both switched to the second band memory 22 side and the switches. 24 and 26 are both switched to the first band memory 21 side. During the period from the time $t_1$ to the time $t_2$, the head 6 moves to the second original mount area OR2.

From the time $t_2$ to a time $t_{2F}$, the images of the originals G6 to G10 of the second original photo film F2 are read, during which the second band memory 22 stores the image signals IM1 which express the originals G6 to G10. While the second band memory 22 stores these image signals IM1, the other image signals IM1 are read from the first band memory 21, processed and filed during a period from the time $t_2$ to a time $t_{25}$ (Section (f) of FIG. 5). Upon completion of processing and filing for the original G5 (at the time $t_{25}$), the variable i changes to 3, whereby the switch control signals SL1 and SL2 rise again (Sections (b) and (c) of FIG. 5). This is followed by a similar sequence.

Thus, in the image processing apparatus of the present invention, since a plurality of originals are processed at one time original mount area by original mount area, a scanning time and a time for the head to move are drastically reduced as compared with those required by the conventional method. Further, provision of the two band memories 21 and 22 for writing and reading data makes possible to perform scanning and filing simultaneously. For these advantages, the image processing apparatus of the present invention is suitable for high-speed mass processing. Still further, since image processing is performed file by file during filing, the image processing conditions need not be switched a high speed. In addition, the image speed needs not be as fast as the filing speed. Because of these advantages, the processing apparatus of the present invention meets the demand for lower costs.

Figure 6:
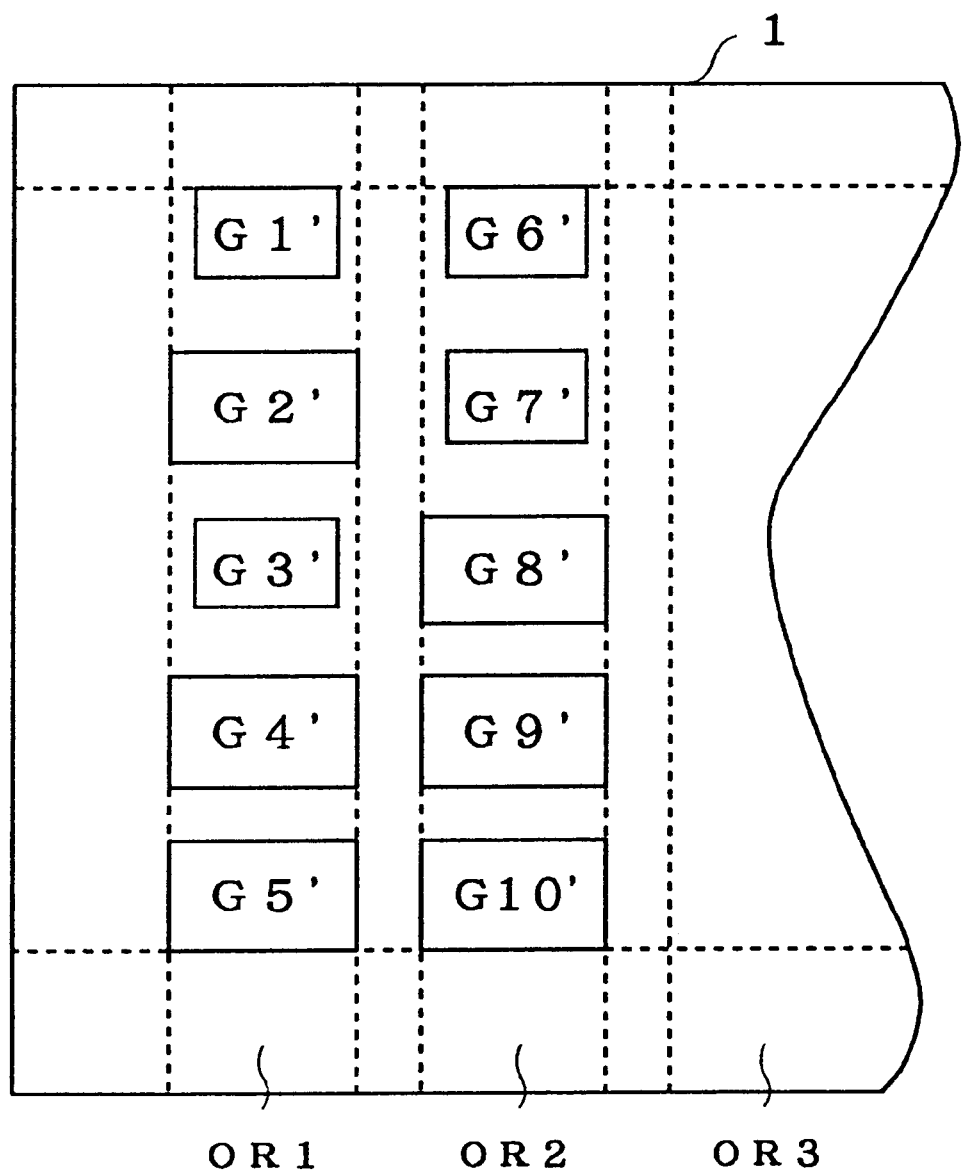
FIG. 6 is an explanatory diagram which shows originals which are arranged within original mount areas and image areas of the originals in another embodiment of the present invention.
Figure 7:
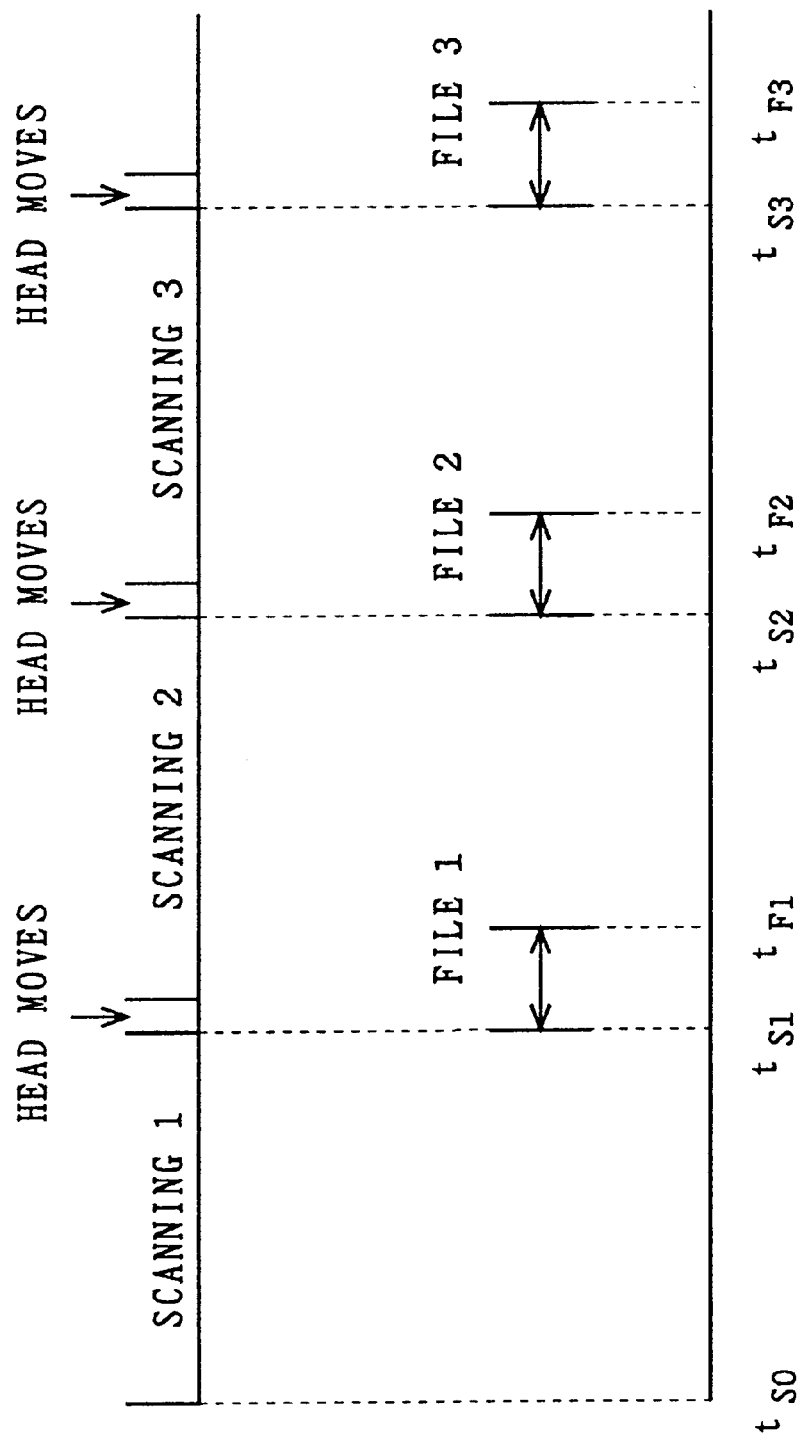
FIG. 7 is a timing chart which shows a conventional technique.
Figure 8A:
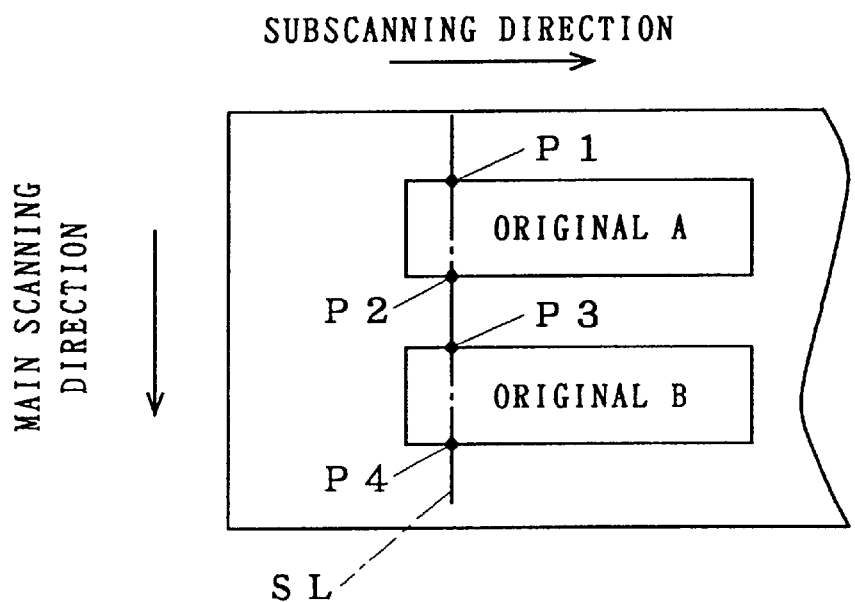
FIGS. 8A and 8B are explanatory diagrams which show the conventional technique.
Figure 8B:
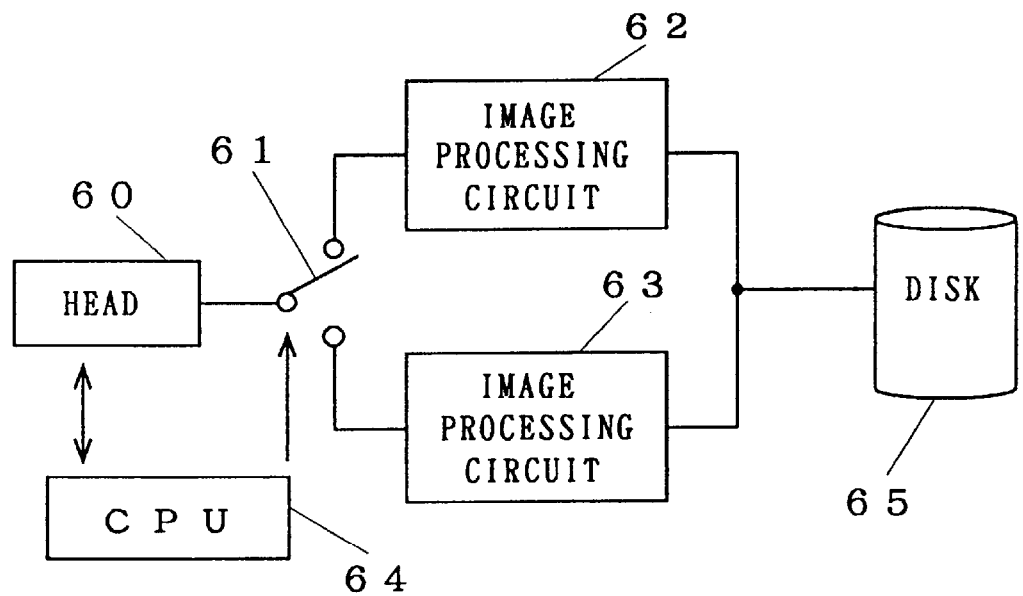

Although the originals of each original mount area have the same configuration and the same size in the embodiment above as shown in FIG. 1, the originals may be arranged as shown in FIG. 6. In FIG. 6, originals G1', G3', G6' and G7' are smaller than the others. In such a case as well, images are read all at one time for each one of the original mount areas ORI, OR2... However, since the original mount area is read where it is not unnecessary, i.e., around the originals G1', G3', G6' and G7', these unnecessary portions must be eliminated during subsequent image processing by trimming.

The foregoing has also described that the reading part 10 of the embodiment above is a so-called cylinder type input scanner. However, the reading 10 may be a so-called flat-bed type input scanner. In this case, plurality of originals are arranged in the respective original mount areas on a glass plate in arrangements as those shown in FIGS. 1 and 6. As to the photo detector of the head, the photo detector needs not be a photo diode as described earlier, but may be a line scan sensor or a surface scan sensor utilizing a CCD element or etc.

Although the foregoing has also described that the embodiment above uses the independent two band memories 21 and 22, only one band memory may be used instead. The memory area of this single band memory may be divided into two portions, one functioning as a first band memory and the other functioning as a second band memory.

Although the embodiment above uses the magnetic disk 40 as a secondary storage medium, other types of storage medium may be used such as an optical magnetic disk, a flexible disk, a compact disk and an IC memory.

Although the embodiment above deals with where originals are photo films (slides). However, the present invention is also applicable to where a plurality of photo prints or cut-out pictures are arranged.

While the invention has been described in detail, the foregoing description is in all aspects illustrative and not restrictive. It is understood that numerous other modifications and variations can be devised without departing from the scope of the invention.

What is claimed is:

1. A method of applying different image processing steps to respective image signals obtained by reading a set of originals, comprising the steps of:

a) holding said set of originals in a two dimensional array consisting of a parallel arrangement of a plurality of original trains, each original train consisting of a plurality of originals and further comprising a step a-1) of holding said set of originals such that each original train is held in a main scanning direction and said parallel arrangement is an arrangement of said plurality of said original trains held in a subscanning direction;

b) reading respective images of said set of originals for each original train to generate a series of image signals and further comprising a step b-1) of reading said set of originals for each scanning line passing through said plurality of originals;

c) alternately selecting one of first and second storage means to alternately write said series of image signals for each original train into said one of said first and second storage means selected and further comprising a step c-1) of accumulating said series of image signals for the respective scanning lines for each original train in said one of said first and second storage means to establish original image signals representing said plurality of originals in said one of said first and second storage means;

d) alternately reading said series of image signals for each original train out of the other of said first and second storage means which is different from the means currently selected by the step c) to thereby obtain original image signals; and e) applying different image processing steps to said original image signals for each original, respectively.

2. The method defined in claim 1, wherein the step b-1) comprises a step of reading said set of originals for each original train in response to timing signals to thereby obtain signals synchronized with said timing signals, the step c) comprises a step c-2) of delivering said series of said image signals to said one of said first and second storage means in response to said timing signals, and the step d) comprises a step d-1) of alternately reading said series of image signals each original train out of the other of said first and second storage means in response to said timing signals.

3. The method defined in claim 2, wherein said step a) comprises a step a-2) of storing respective coordinate values which represent the respective originals held by said step a-1), and said step d-1) comprises a step of alternately reading said series of image signals out of the other of said first and second storage means in accordance with said respective coordinate values.

4. The method defined in claim 3, further comprising the step of:

f) setting respective conditions of said different image process steps prior to the step b).

5. An image processor for applying different image processing steps to respective image signals obtained by reading a set of originals, comprising:

original holder means for holding said set of originals in a two dimensional array consisting of a parallel arrangement of a plurality of original trains, each original train consisting of a plurality of originals;

image reader means for reading respective images of said set of originals for each original train to generate a series of image signals, wherein said image reader means comprises an image-scan reader operable to read said set of originals for each scanning line passing through said plurality of originals, each original train is held on said original holding means in a main scanning direction, and said parallel arrangement is an arrangement of said plurality of original trains of a subscanning direction;

first and second storage means each of which is capable of storing said series of said image signals for each original train, wherein said series of image signals for the respective scanning lines are accumulated for each original train in said first and second storage means to establish original image signals representing said plurality of originals in said one of said first and second storage means;

write-control means for alternately selecting one of said first and second storage means to alternately write said series of image signals for each original train into said one of said first and second storage means selected;

read-control means for alternately reading said series of image signals for each original train out of the other of said first and second storage means which is different from the means currently selected by said write-control means to thereby obtain original image signals for each original train; and image processing means for applying different image processing steps to said original image signals for each original, respectively.

6. The image processor defined in claim 5, further comprising timing signal generator means for generating timing signals, wherein said image reader means comprises means for reading said set of originals for each original train in response to said timing signals to thereby obtain said series of image signals synchronized with said timing signals, and said write-control means comprises:
- first switching means for connecting said image means to said one of said first and second storage in response to said timing signals; and
- second switching means for connecting the other of said one of said first and second storage means to said image processing in response to said timing signals.

7. The image processor defined in claim 6, further comprising means for storing respective coordinate values representing positions of the respective originals on said original holding means, wherein said read-control means comprises means for reading said original image signals out of the other of said first and second storage means in accordance with said respective coordinate values.

8. The image processor defined in claim 7, further comprising means for setting respective conditions of said different image process steps.

* * * * *